(12) United States Patent
Fisker et al.

(10) Patent No.: US 8,837,026 B2
(45) Date of Patent: Sep. 16, 2014

(54) ADAPTIVE 3D SCANNING

(75) Inventors: Rune Fisker, Virum (DK); Tais Clausen, Copenhagen (DK); Nikolaj Deichmann, Copenhagen (DK); Henrik Ojelund, Lyngby (DK)

(73) Assignee: 3Shape A/S, Kovenhavn (DK)

( * ) Notice: Subject to any disclaimer, the term of this patent is extended or adjusted under 35 U.S.C. 154(b) by 1318 days.

(21) Appl. No.: 11/572,424

(22) PCT Filed: Jul. 22, 2005

(86) PCT No.: PCT/DK2005/000507
§ 371 (c)(1),
(2), (4) Date: Aug. 6, 2008

(87) PCT Pub. No.: WO2006/007855
PCT Pub. Date: Jan. 26, 2007

(65) Prior Publication Data
US 2008/0306709 A1      Dec. 11, 2008

(30) Foreign Application Priority Data

Jul. 23, 2004    (DK) .................................. 2004 01143

(51) Int. Cl.
*G02B 26/08* (2006.01)
*G06T 17/00* (2006.01)
(52) U.S. Cl.
CPC ................ *G06T 17/00* (2013.01); *Y10S 359/90* (2013.01)
USPC ............. 359/196.1; 359/900; 703/1; 345/420
(58) Field of Classification Search
USPC ............. 359/196.1–226.2, 896, 900; 700/98, 700/118; 703/2, 6, 1; 345/419; 702/167
See application file for complete search history.

(56) References Cited

U.S. PATENT DOCUMENTS

| 5,831,621 A | 11/1998 | Pito |
| 6,249,600 B1 | 6/2001 | Reed et al. |

(Continued)

FOREIGN PATENT DOCUMENTS

| DE | 197 21 888 A1 | 9/1998 |
| WO | WO02/39056 A1 | 5/2002 |

OTHER PUBLICATIONS

Adam Baumberg: Blending images for texturing 3D models, Proceedings of the 13th British machine vision conference, Sep. 5, 2002, pp. 404-413, XP002352035; University of Cardiff; p. 404-p. 406; p. 413.

(Continued)

*Primary Examiner* — James Phan
(74) *Attorney, Agent, or Firm* — Buchanan Ingersoll & Rooney PC

(57) ABSTRACT

The present invention relates to adaptive 3D scanning wherein a scan sequence for obtaining full geometrical coverage of a physical object are created automatically and specifically for the physical object, by using a method and a system for producing a 3D computer model of a physical object, wherein the method comprises the following steps providing a scanner system, said scanner system comprising a scanner, and a computer connectable to and/or integrated in said scanner, said computer comprising a virtual model of said scanner, entering shape information of the physical object into the computer, creating in said computer a visibility function based on said virtual model and the shape information, said visibility function being capable of evaluating the coverage of areas of interest of the physical object by at least one predetermined scan sequence, establishing at least one scan sequence based on the evaluation of the visibility function, performing a scan of the physical object using said at least one scan sequence, and obtaining a 3D computer model of the physical object.

2 Claims, 5 Drawing Sheets

Optical scanning system

Scanning of uncovered areas

(56) References Cited

U.S. PATENT DOCUMENTS

| | | |
|---|---|---|
| 6,377,865 B1 * | 4/2002 | Edelsbrunner et al. .......... 700/98 |
| 2003/0164952 A1 | 9/2003 | Delchmann et al. |
| 2005/0068544 A1 * | 3/2005 | Doemens et al. ............. 356/601 |

OTHER PUBLICATIONS

Bor-Tow Chen; Wen-Shiou Lou; Chia-CHen Chen; Hsien-CHang Lin;: A 3D Scanning System Based on Low-Occlusion Approach; 3D Digital Imaging and Modeling. Proceedings. Second International Conference, Oct. 8, 1999,—pp. 506-515, XP002352034, p. 3 figure 4.

Aan S H et al: Robust factorization; IEEE Transactions on Pattern Analysis and Machine Intelligence, IEEE Service Center, Los Alamitos, CA US, vol. 9, No. 24, Sep. 2002 pp. 1215-1225, XP001141405; ISSN:0162-8828 the whole document.

Fisker R et al: On parameter estimation in deformable models; Pattern Recognition, 1998 Proceedings. Fourteenth International Conference on Brisbane, Qld., Australia Aug. 16-20, 1998 Los Alimitos, CA USA, IEEE Comput. Soc, US; vol. 1, Aug. 16, 1998; pp. 762-766, XP010297431; ISBN:0-8186-8512-3 the whole document.

Chen et al., 2004, "3D object reconstruction from multiple controlled viewpoints", Proceedings of the 5th World Congress on Intelligent Control and Automation, Jun. 15-19, 2004, Hangzhou, P.R. China, pp. 4645-4649.

Cowan et al., 1988, "Automatic sensor placement from vision task requirements", IEEE Transactions on Pattern Analysis and Machine Intelligence, vol. 10, No. 3, pp. 407-416.

Kowarschik et al., 2000, "Adaptive optical three-dimensional measurement with structured light", Opt. Eng. 39(1), SPIE, pp. 150-158.

Massios et al., 1998, "A best next view selection algorithm incorporating a quality criterion", British Machine Vision Conference '97 (BMVC'97), Southampton, Sep. 1998, pp. 780-789.

Maver at al., 1993, "Occlusions as a guide for planning the next view", IEEE Transactions on Pattern Analysis and Machine Intelligence, vol. 15, No. 5, May 1993, pp. 417-433.

Papadopoulus-Orfanos et at., 1997, "Automatic 3-D digitization using a laser rangefinder with a small field of view", The 1997 1st International Conference on Recent Advances in 3-D Digital Imaging and Modeling, Ottawa, Canada, May 12-15, 1997, pp. 60-67.

Pito, 1999, "A solution to the next best view problem for automated surface acquisition", IEEE Transactions on Pattern Analysis and Machine Intelligence, col. 21, No. 10, Oct. 1999, pp. 1016-1030.

Reed et al., 1999, "3-D modelling from range imagery: an incremental method with a planning component", Image and Vision Computing 17, 1999, pp. 99-111.

Scott at al., 2003, "View planning for automated three-dimensional object reconstruction and inspection", ACMComputing Surveys, vol. 35, No. 1, Mar. 2003, pp. 64-96.

Tarabanis et al., 1995, "A survey of sensor planning in computer vision" IEEE Transactions on Robotics and Automation, vol. 11, No. 1, Feb. 1995, pp. 86-104.

Tarbox et al., "Planning for complete sensor coverage in inspection", Computer Vision and Image Understanding, vol. 61, No. 1, Jan 1995, pp. 84-111.

Wong et al., 1999, "Next best view system in a 3-D object modelling task", Proceedings of IEEE International Symposium on computational intelligence in robotics and automation, CIRA '99, Monterey, CA, Nov. 1999, pp. 306-311.

Opposition against European Patent No. EP 1 774 465; Opponent Straumann Holding AG; Jan. 27, 2010.

\* cited by examiner

Figure 1

Optical scanning system

Adaptive scanning of object to create 3D computer model

Fig. 3

Scanning of uncovered areas

Fig. 4

Automated creation of initial scan

Fig. 5
Dental impression scanning

ADAPTIVE 3D SCANNING

The present invention relates to production of 3D computer models of a physical object.

BACKGROUND

Structured light 3D scanner systems basically functioning the same way have been described in the prior art. They basically function as described in FIG. 1, wherein a monochromatic or multi spectral light pattern 101, such as laser dots, laser lines, white or colored strips, is projected from a light source 102 onto the object 103. The projected light is then reflected 104 and one or more cameras 105 acquire(s) images of the projection. The light pattern is detected in the image and well established projection geometry such as triangulation or stereo is used to derive the 3D coordinates, e.g. a line laser is projected onto the object forming a line. The 3D coordinates are then reconstructed along that particular line. The scanner may contain one or more light sources/patterns and one or more cameras.

Figure 1:
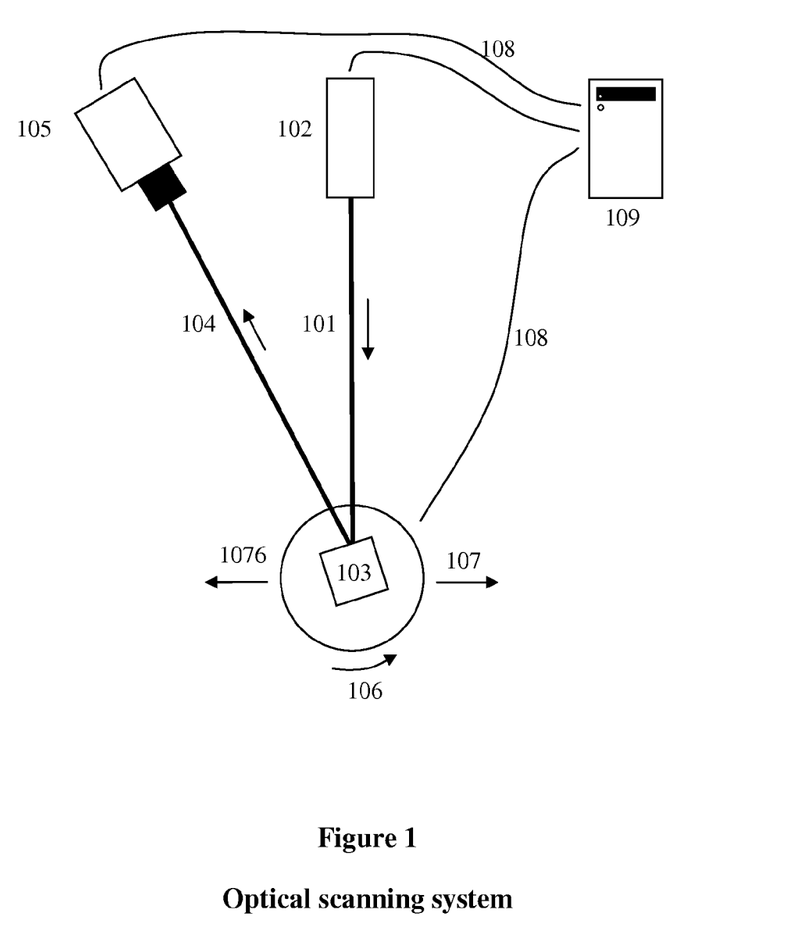
FIG. 1 shows a schematic drawing of a 3D scanner system
Figure 2A:
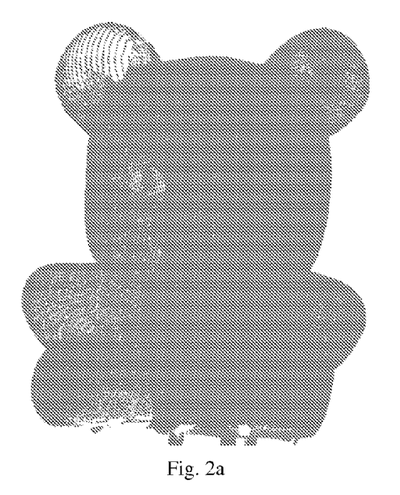
FIGS. 2a-d shows an example of a physical object to be scanned
Figure 2B:
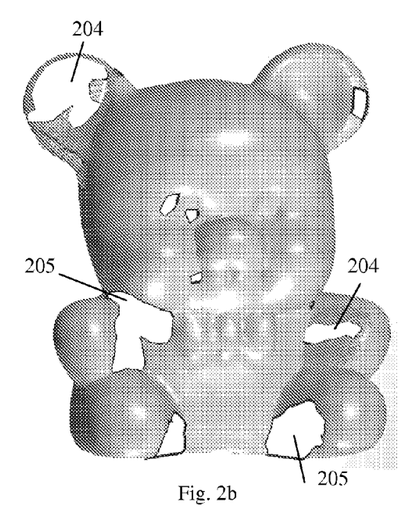
Figure 2C:
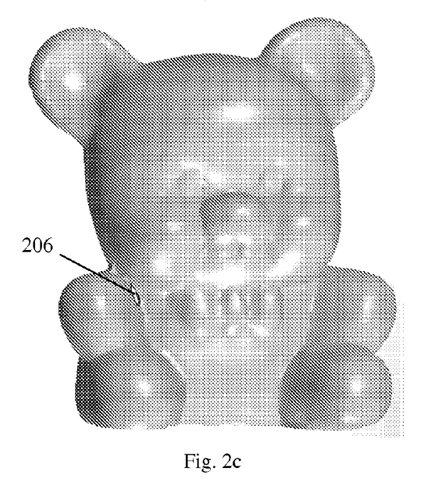
Figure 2D:
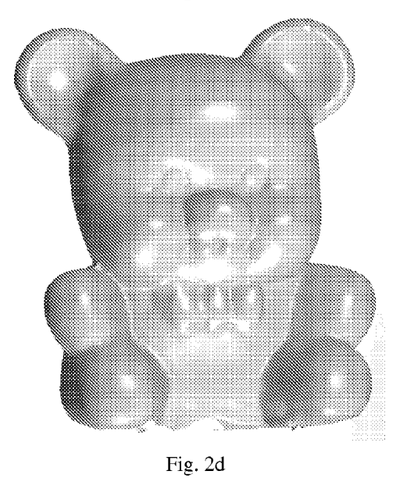

The next step is then to move the object and scanner relative to each other e.g. by rotation 106 or linear motion 107 of the object 103. This way the scanner can reconstruct the surface on a new part of the object, e.g. a new line on the surface in the line laser example. The scanners in the prior art have the motion manually programmed in a predefined scan sequence or the object/scanner is simply manually moved around.

An inherited problem with structured light 3D scanning is that both camera and light pattern need to "see" each surface point at the same time to be able to make a 3D reconstruction of that particular point. This leads to "occluded" or uncovered areas which appear as surface holes in the final scan, i.e. areas without surface measurement information. Holes in the scan are in most cases undesirable or unacceptable both from a visual and application point of view.

The problem is illustrated in FIG. 2, where the point cloud 2a of the initial scan of a toy bear is shown. The initial scan is performed by a predefined scan sequence of two rotation scans. When the surface model 2b is created the uncovered areas appear as holes e.g. 204. Adaptive scanning is then used to make a scan sequence that scans the holes in an additional scan. In fact two holes 205 have already been adaptively scanned and covered by new points. After the first adaptive scan a single hole 206 is still present in the surface model 2c of the merged result of the initial and adaptive scan. A second adaptive scan is then performed and full coverage is obtained 2d.

In the prior art the occlusion problem is attempted to be solved by manually definition of complex scan sequences and constraints on how the object is positioned in the scanner. However long and time consuming scan sequences is required to cover just simple shapes or objects with moderate shape variation. In the case of objects with varying shapes this does still not guarantee full coverage. Another problem is that the creation of the scan sequences can be very cumbersome and requires expert knowledge.

To fix the problem with uncovered areas some commercial scanners artificially close the holes in the scan using the surface information around the hole. The artificial hole closing might be performed by fitting parametric surface such as spline surface or second order surfaces. Artificial hole closing might give visually pleasant results, but the accuracy is very low, which is unacceptable for most application.

SUMMARY OF THE INVENTION

The present invention relates to adaptive 3D scanning wherein a scan sequence to obtain full geometrical coverage are created automatically and specifically for the physical object.

Accordingly, the present invention relates to a method and a system for producing a 3D computer model of a physical object, wherein the method comprises the following steps
a) providing a scanner system, said scanner system comprising
  i. a scanner, and
  ii. a computer connectable to and/or integrated in said scanner, said computer comprising a virtual model of said scanner,
b) entering shape information of the physical object into the computer,
c) creating in said computer a visibility function based on said virtual model and the shape information, said visibility function being capable of evaluating the coverage of areas of interest of the physical object by at least one predetermined scan sequence,
d) establishing at least one scan sequence based on the evaluation of the visibility function,
e) performing a scan of the physical object using said at least one scan sequence,
f) optionally repeating steps d) and e) at least once,
g) obtaining a 3D computer model of the physical object.

In another aspect the invention relates to a data processing system for producing a 3D computer model of a physical object, including an input device, a central processing unit, a memory, and a display, wherein said data processing system has stored therein data representing sequences of instructions which when executed cause the method as defined above be performed.

In yet another, aspect the invention relates to a computer software product containing sequences of instructions which when executed cause the method as defined above to be performed.

In a fourth aspect the invention relates to an integrated circuit product containing sequences of instructions which when executed cause the method as defined above to be performed.

DETAILED DESCRIPTION OF THE INVENTION

The invention is related to the field of 3D scanning of physical objects, i.e. the creation of 3D computer models that in details resemble the physical objects geometry and optional textural, surface and material features. The invention will be described for 3D optical structured light scanners, but can be applied to most other types of 3D scanners, such as touch probe scanners, laser range scanners, MR, MRI, CT, x-rays, ultra sound, range cameras, time-of-flight sensors or optical scanners based on silhouettes, structure and motion, shape from shading, shape from texture or color keying.

A scan sequence defines the actual scan including the motions, the active cameras, the active lights sources, active light patterns and other relevant settings. A scan sequence can be anything from a single scan without motion to scanning with long and complex motion sequences.

For simplicity motion of the object is only mentioned in the following text. However it should be interpreted as relative motion where at least one component of the system and/or the object is moved, such as wherein either object or scanner is moved. This also covers movement of light pattern and the cameras field of view preferably using mirrors or prisms even though the scanner is not physically moved.

The structured light 3D scanner systems comprising a scanner and a computer connected and/or integrated into the scanner. Preferably the scanner contains one or more light sources 102, one or more cameras 105 and a motion system 106-107, which is able to move the object relative to the camera and light source. Note that the motion system is not necessarily limited to a single rotation 106 and a single linear motion 107 as shown in FIG. 1, but might preferably be a multi axis system with many degrees of freedom such as a CNC machine or a robot. Camera, light source and motion system are all connected 108 to a computer 109, which communicate with and controls each component. The computer might be a separate unit or integrated into the scanner.

The invention is adaptive 3D scanning where scan sequences for obtaining full geometrical coverage are created automatically. In other embodiments of the invention sequence files are automatically created for optimal scanning of texture, surface material parameters, shinny surfaces and other relevant features. Note that coverage should be widely interpreted with respect to scanning these features.

Shape information of step b) may be any information of the shape of the physical object. It may be a direct shape information, such as shape information which may e.g. originate from one or more initial scans, It may alternatively or additionally be indirect shape information, such as information in the form of template shapes, simplified or approximate shapes such as boxes and cylinders or combinations hereof, average shapes, CAD models or be derived from one or more 2D images. Note that the shape information does not need to be 3D information, but may also be 1D, 2D, 4D or 5D. The shape information may originate from other scanners than structured light scanners preferably touch probe scanners, MR, MRI, CT, x-rays or ultra sound. Different shape information may also be fused e.g. by registration of the result of an initial scan to other shape information preferably a CAD model, template or average shape. In one embodiment shape information is a combination of direct shape information and indirect shape information.

In one embodiment the shape information of the physical object is a point cloud, such as wherein the shape information of the physical object is obtained by fitting a surface to a point cloud. The fitting may be conducted by any suitable method, such as conducted as triangulation.

The shape information is preferably aligned to the physical object, such as wherein the shape information and the object is aligned by a fixation of the object in the scanner. In another embodiment the shape information and the object is aligned by an initial scan which is aligned to the shape information.

Figure 3:
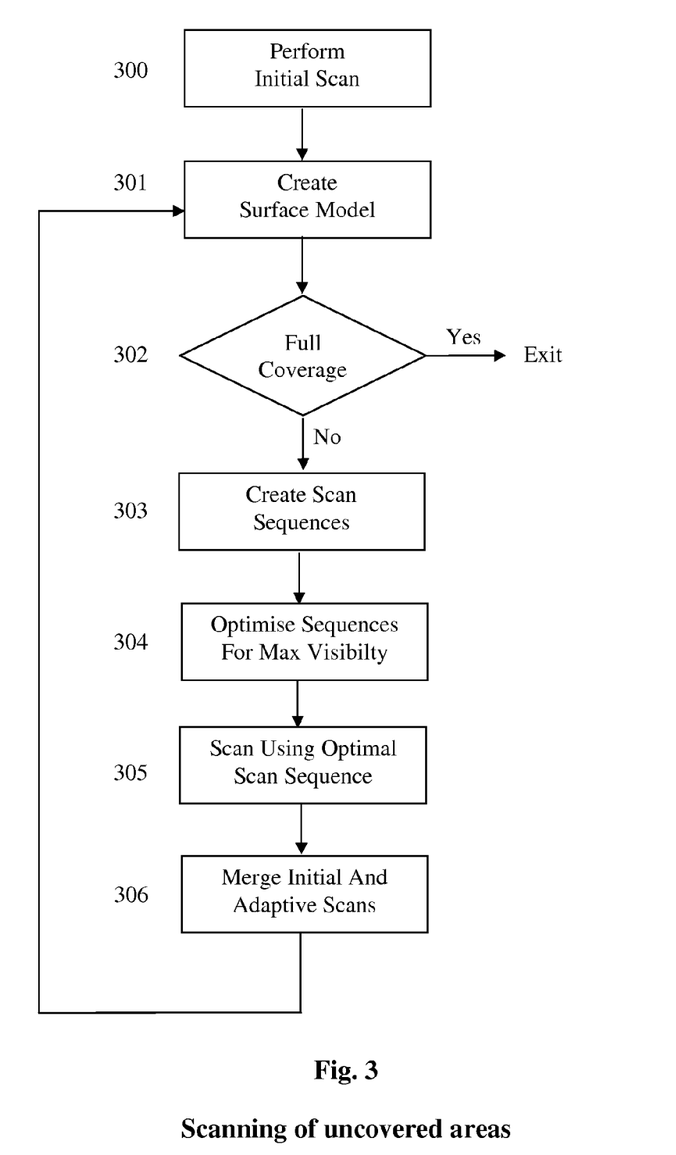
FIG. 3 shows a flow chart for a scanning of uncovered areas

Adaptive 3D scanning facilitates the possibility for truly one button scan of arbitrary objects, i.e. the user just insert an arbitrary object in the scanner and press a single button. The entire scanning is then performed automatically in an optimal way and outputs a full coverage scan. No need for expert knowledge for creation of complex scan sequences, tuning of scanning parameters or manual stitching/merging of different scans. No scanner in the prior art is close to achieve this goal. FIG. 3 shows one embodiment of the invention where the shape acquisition is performed by an initial scan 300 preferably using combination of linear scans, rotation scans or simultaneous motion of several axes. By a linear scan is understood a relative linear motion of the object or a linear sweep of the light pattern over the object. The resulting scan is then analyzed for uncovered areas and these areas of interest are automatically rescanned using the optimal combination of motions, light patterns, light sources and cameras. The new adaptive scan might then be merged with the result of the initial scan to form a full coverage scan.

By the term "full coverage" is meant the degree of coverage defined with respect to the specific 3D computer model. Thus, it may be accepted that not all occluded holes are covered if the holes are of a size or localization of minor interest. It may also be relevant to predetermine that the time for scanning is the limiting factor, so that "full coverage" is obtained when the scanning has been running for a predetermined period of time. Accordingly, full coverage stop criteria may be different than absolute coverage of all holes, the stop criteria may be holes under a certain threshold are ignored, only a certain number of iterations are allowed, maximal scan time or a certain overall coverage is only needed.

The first step in the adaptive scanning might be to determine which areas that are not properly covered in the initial scan. Preferably this is done by creating the surface model 301 e.g. by triangulation of the point cloud or fitting of parametric surfaces such as spline surfaces. If surface models are supposed to be created in the post processing of the scan it is advantageous to apply the same surface creation algorithm. When the surface model is present full coverage can be directly evaluated 302, since uncovered areas correspond to the holes in the surface. Uncovered areas can also be determined directly from the point cloud, voxel data or other raw data. Dependent on the application some holes such as the bottom of the object might be ignored. The full coverage stop criteria 302 might be modified to express other priorities as described above.

Adaptively determining the combination of motions, light patterns, light sources and cameras ensuring optimal coverage of each area of interest is the crucial step of the adaptive scanning. Recall that the area of interest in this embodiment corresponds to the uncovered areas. The first step is to construct the visibility function, i.e. given shape information and a specific configuration of camera, light source/pattern and object motion the current visibility of the uncovered area can be evaluated. To be able to evaluate the visibility a virtual scanner model that replicates the physical scanner is created preferably including camera model and parameters, light sources/pattern model and parameters, motion models and parameters, motion values and other relevant parameters. The camera model might for example be a standard projective model with parameters such as camera position and orientation. Many parameters in the virtual scanner are specific to the scanner and are obtained through a calibration procedure. Preferably these parameters should be included in the virtual scanner model.

The virtual model of the scanner, ie. the virtual scanner model, forms part of the basis for creating the visibility function. The virtual scanner function may be created in relation to each production of a 3D computer model, or it may be created once in the scanner system and only re-created if changes are made to the scanner system. The virtual scanner model may be created before, after or simultaneous with the entrance of the shape information of the physical object into the computer, however it is preferred that the virtual scanner model is created before entrance of the shape information.

The virtual scanner model is then used to evaluate the visibility of an uncovered area given position and orientation information of the object, camera settings, light source/pattern settings and other relevant features. When evaluating the visibility it might be advantageous to evaluate the visibility in a number of sample points/cells/patches sampled over the uncovered area. In the case of missing shape information sampling points might be approximated e.g. by interpolation or surface fitting. The visibility of each sample point might be calculated from the point's degree of visibility for both light source/pattern and camera simultaneous. For many scanner configurations the object need to be moved while scanning an uncovered area. This motion need to be taken into account during the visibility evaluation.

The optimal sequence of motions, light patterns, light sources and cameras for scanning an uncovered area is then found as the sequence that maximizes the visibility. In one embodiment the at least one scan sequence of step d) is established by simulating the coverage of the physical object of at least two scan sequences, and selecting the scan sequence having an optimal coverage.

The scan sequence established in step d) is preferably established for obtaining coverage of occluded holes in the shape information of the physical object.

Preferably the optimal sequence is found by creation of one or more scan sequences 303 which are then optimized. The optimization of the visibility function 304 might be performed with respect to any free parameter in the virtual scanner model, though limiting the optimization to motion parameters and different combinations of camera and light source might be advantageous. The actual optimization might be performed by a standard optimization algorithm such as steepest descent, conjugated gradient, Levenberg-Marquardt, Newton or Quasi-Newton methods, BFGS, simulated annealing or generic algorithms. Constraints on parameters such as physical axis limits might be added as hard constraints or soft constraints.

Additional factors might also be integrated into the visibility function such that the function value reflects other priorities than just visibility. Even though the visibility function contains more factors than pure visibility the function will still be named visibility. Additional factors might be scan time, visibility for several cameras, reflection suppression, surface normal to camera/light source angle or textural visibility. It might also be advantageous to split uncovered areas in high curvature surface to improve visibility or combined the scanning of neighboring areas to achieve lower scan times.

Thus, in one embodiment the scan sequence is established by optimising the scanner for best angle surface to camera and/or laser angle. In another embodiment the scan sequence established by optimising for speed of scan sequence. In a third embodiment the scan sequence established is optimised for minimal reflections from physical object, and in a fourth embodiment the scan sequence established is optimised for visibility for more than one camera. In further embodiments the scan sequence established is optimised for two or more of the factors mentioned above. Thereby, a scan sequence may be created by moving at least one of the components of the scanner relative to at least one of the other components.

The optimal scan sequence is then selected as the one which have the maximal visibility. Additional factors can also be used to select the optimal configuration if several sequences achieve full visibility. A scan is performed using the optimal scan sequence 305 and the result is merged with previously performed scans 305. The surface model might then be created for the merged scans 301 and the resulting scan might be checked for full coverage 302. If full coverage is not obtained in the combined scan then a second adaptive scan might be performed. For complex shapes several adaptive scan sequences might be required to obtain full coverage, because uncovered areas can contain shapes that occlude other parts of the uncovered area.

The coverage of areas of the physical object may be evaluated by any suitable method. In one embodiment the coverage of areas of the physical object is evaluated by evaluating percentage of area of holes as compared to estimated area of the physical object. In another embodiment the coverage of areas of the physical object is evaluated by evaluating the size of holes. In yet another embodiment steps d) and e) are repeated until the coverage of the physical object is above a predetermined value. Combination of the different methods of determining coverage may also be envisaged by the invention, for example by first evaluating the size of holes and second evaluate the percentage of area of holes.

The scanner system according to the invention may be any suitable scanner system, examples of these are mentioned below. In principle the scanner system according to the invention comprises the following components: at least one light source, at least one camera, and at least one support for supporting the physical object.

It is preferred that at least one of the following components: the light source, the camera and the support is movable relative to one of the other components, and the present invention encompasses systems wherein two or more the components are movable in relation to at least one of the other components. Accordingly, examples of the invention include systems wherein the support may be movable in relation to the light source, and/or the support may be movable in relation to the camera, preferably the support for supporting the physical object is capable of conducting at least one of the following movements: a linear movement, a rotational movement, or a combination thereof.

The scanner system according to the invention may comprise more components, such as a the scanner system comprising at least two light sources, and/or a scanner system comprising at least two cameras.

For the scanner showed in FIG. 1 the simplest virtual scanner model will contain a camera model, a light model and models for the rotation and linear motion. To complete the virtual scanner model calibrated values for all scanner model parameters such as camera position for a specific scanner is inserted. Given shape information the visibility function can now be evaluated. The only free parameters in the scanner are the rotation and linear motion. Any combination of rotation and linear motion can be used to scan holes in the initial scan. However using rotation for turning the hole for maximal visibility and linear motion to actually scan the area is a simple and powerful configuration. In practice this limits the free parameter to rotation since the linear motion can be derived from the rotation angle and the size of the hole. Given a scan sequence 303 with an initial guess of the rotation angle the optimal scan sequence can be found by optimization the visibility function f( . . . ) 304 with respect to the rotation angle $\theta$:

$$\text{Max}_\theta f(\theta | \text{shape information, virtual scanner model})$$

The output of the optimization, $\theta_{max}$, and the corresponding sequence file ensures maximal visibility. The actual optimization might be performed using one of the previously mentioned optimization algorithms e.g. a steepest descent preferably using numerical gradient evaluation with a steep size, Δθ, on 1 degree. The next step is then to scan using the optimal sequence file 305. The resulting scan is then merged with previous scans 306 and the surface is created 301 and checked for full coverage 302. If full coverage is not obtained yet a new iteration can be performed. As discussed elsewhere herein, the term "full coverage" means full coverage in relation to the specific 3D computer model, and does not necessarily mean that every part of the physical object is covered.

Figure 4:
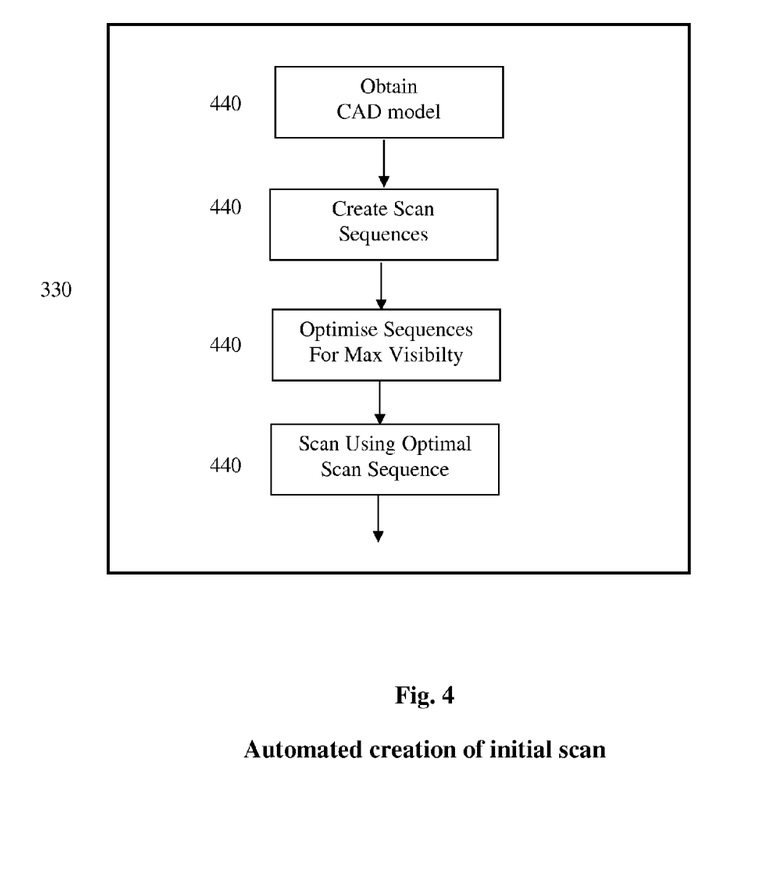
FIG. 4 shows a flow chart for automated creation of initial scan

FIG. 4 shows another embodiment of the invention where the virtual scanner model and the visibility function is used to create the first initial scan 300 based on indirect shape information not scanned directly from the object. Preferably the indirect shape information is obtained from a CAD model 400, an average or a template model. In this case the area of interest corresponds to the full model.

In the same virtual scanner framework as in the previous embodiment one or more scan sequences 401 are created and the free parameters are optimized 402 with respect to the visibility function. Dependent on the actual application additional factors might be added to the visibility function such as the number of sub-scans, visibility for mutual sub-scans and scan time. The optimal scan sequence is then used for the initial scan of the object 403.

The absolute positions of the object need to be known to perform a successful scan. Preferably the position is obtained from a fixation of the object in the scanner or more flexible by running a fast predefined scan, which is then registered/aligned to the shape model. If required this might then be followed by a second scan 301-305 to close possible holes.

A simple way to speed up the scanning is to let the user select the area of interest on some representation of the object. If shape information is known prior to scanning the representation is preferably a CAD model, template model or average model otherwise the representation might be the result of a fast scan or even faster just a 2D image captured by the cameras. Note that a selection on a 2D image created by the scanner directly can be transformed to a 3D selection by the use of the virtual scanner model. This user selected area of interest is then used directly for determining the optimal scan sequence.

Another embodiment of the invention can be applied to scanners that capture the texture of the object where modifications of the visibility function can ensure full coverage of texture all over the object. The object geometry can either originate from a scan or an indirect obtained model. The main difference to the plain geometry scanning is the formulation of the visibility function which now might incorporate texture features such as the visibility of the texture and surface normal to camera angle. The visibility function can either be formulated to incorporate simultaneous or separate geometry and texture capture depending on the scan strategy.

In a similar way the invention can also be applied for capturing lightning, shading and material parameters mainly used for rendering images of realistic visual appearance of objects. This is implemented by extending the formulation of the visibility function to incorporate illumination and material parameter estimation factors. Many different illumination and material models exist such as Phong shading, Gouraud shading or BRDF models. However the visibility function should be general applicable to all different models and estimation algorithms.

The 3D computer model of the physical object may be based on one of the results obtained by the scan in step e), or the 3D computer model of the physical object may obtained by combining information from the any other information of the physical object and at least one of the results of the scan performed in step e), such as a combination with the shape information and scan results.

The 3D computer model of the physical object may also be obtained by combining information from at least two scan sequences performed in step e), and by optionally combining information from at least two scans with any other information, such as the shape information.

Even though the invention has been described with respect to structured light scanners it should be clear for the skilled reader that the invention can be applied to perform adaptive scans for other types of scanners, such as surface scanners. Thus, the invention may also be carried out using e.g. touch probe scanners, laser range scanners, MR, MRI, CT, x-rays, ultra sound, range cameras, time-of-flight sensors or optical scanners based on silhouettes, structure and motion, shape from shading, shape from texture or color keying. The main difference is the different formulation of the virtual scanner models and the visibility function.

The present invention may be used for production of 3D computer models of any physical object, and thus the adaptive scanning is relevant in most 3D scanning applications. The physical objects may have a regular or irregular surface, and the invention is particular relevant for production of 3D computer models of physical objects having an irregular surface. Examples of applications are scanning of dental impressions, dental casts and dies, lasts, jewelries, art, cultural and historical artifacts, manufactured parts for quality analysis and mould making, ear impressions, metrology, reverse engineering, easy creation of realistic 3D models for home pages, computer games and animation of movies, cartoons and commercials.

Optical scanning of arbitrary anatomical or dental impressions is an application which is impossible to perform without adaptive scanning. Dental impressions are negative impression of the teeth and are usually made by some kind of silicone material. Due to the shape of teeth and their biological variation achievement of full coverage is very challenging, since scanning down into an impression of an arbitrary tooth requires very accurate viewing positions and motion. When the scan is used for dental restorations very high accuracy is required to obtain a proper fit, which rules out artificial hole closing. Thus, the present invention is particular suitable for application in the dental field, such as for scanning of teeth, a prosthesis, or impressions of one or more teeth or a prosthesis.

Figure 5:
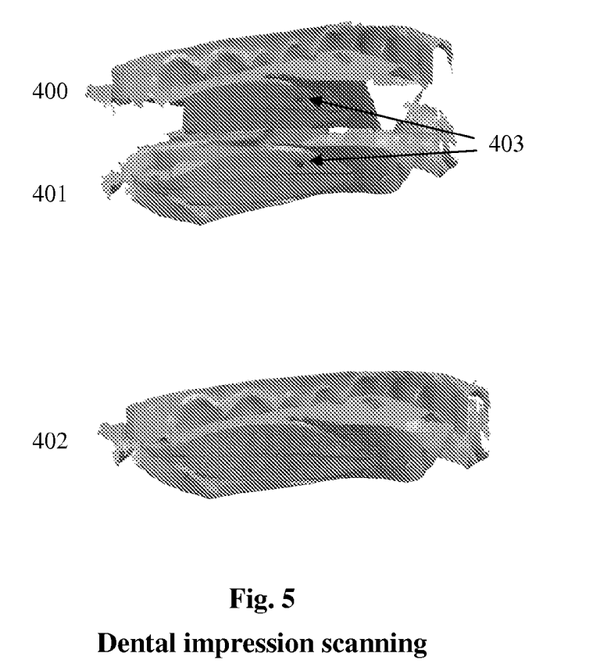
FIG. 5 shows a 3D computer model of a dental impression

FIG. 5 shows an adaptive scan of the upper 400 and lower side 401 of a double sided dental impression, which simultaneous captures both the negative teeth impressions and the bite. To form the full scan 402 of a double sided impression the upper and lower impression scan might be registered preferably automatically but optionally supported by user marking of one or more corresponding points 403 on the two scans.

In another aspect the invention relates to a scanner system capable of performing the method as described above. Accordingly, the invention relates to a scanner system for producing a 3D computer model of a physical object, comprising at least one light source, at least one camera, and at least one support for supporting the physical object, and a data processing system including an input device, a central processing unit, a memory, and a display, wherein said data processing system has stored therein data representing sequences of instructions which when executed cause the method described above to be performed. The components of the scanner system is as described above in relation to the method.

In a third aspect the invention relates to a data processing system as described above for producing a 3D computer model of a physical object, including an input device, a central processing unit, a memory, and a display, wherein said data processing system has stored therein data representing sequences of instructions which when executed cause the method of the invention to be performed.

In a fourth embodiment the invention relates to a computer software product containing sequences of instructions which when executed cause the method of the invention to be performed.

In a fifth embodiment the invention relates to an integrated circuit product containing sequences of instructions which when executed cause the method of the invention to be performed.

The invention claimed is:

1. A method for producing a 3D computer model of a physical object, said method comprising the following steps
   a) providing a scanner system, said scanner system comprising
      i. a scanner, and
      ii. a computer connectable to and/or integrated in said scanner, said computer comprising a virtual model of said scanner,
   b) entering shape information of the physical object into the computer,
   c) creating in said computer a visibility function based on said virtual model and the shape information, said visibility function being capable of evaluating the coverage of areas of interest of the physical object by at least one predetermined scan sequence,
   d) establishing at least one scan sequence based on the evaluation of the visibility function,
   e) performing a scan of the physical object using said at least one scan sequence,
   f) optionally repeating steps d) and e) at least once,
   g) obtaining a 3D computer model of the physical object, wherein the coverage of areas of the physical object is evaluated by evaluating percentage of are of holes as compared to estimated area of the physical object.

2. A method for producing a 3D computer model of a physical object, said method comprising the following, steps
   a) providing a scanner system, said scanner system comprising
      i. a scanner, and
      ii. a computer connectable to and/or integrated in said scanner, said computer comprising a virtual model of said scanner,
   b) entering shape information of the physical object into the computer,
   c) creating in said computer a visibility function based on said virtual model and the shape information, said visibility function being capable of evaluating the coverage of areas of interest of the physical object by at least one predetermined scan sequence,
   d) establishing at least one scan sequence based on the evaluation of the visibility function,
   e) performing a scan of the physical object using said at least one scan sequence,
   f) optionally repeating steps d) and e) at least once,
   g) obtaining a 3D computer model of the physical object, wherein the coverage of areas of the physical object is evaluated by evaluating the size of holes.

* * * * *